UNITED STATES PATENT OFFICE.

JOHN T. JONES, OF IRON MOUNTAIN, MICHIGAN, ASSIGNOR OF ONE-HALF TO GEORGE A. ST. CLAIR, OF DULUTH, MINNESOTA.

METHOD OF DEPHOSPHORIZING AND REDUCING IRON ORE.

No. 890,233.  Specification of Letters Patent.  Patented June 9, 1908.

Application filed December 23, 1907. Serial No. 407,773.

*To all whom it may concern:*

Be it known that I, JOHN T. JONES, a citizen of the United States, residing at Iron Mountain, in the county of Dickinson and State of Michigan, have invented a new and useful Improvement in Methods of Dephosphorizing and Reducing Iron Ore, of which the following is a specification.

My object is to provide a simple, efficient, and economical method of preparing and treating finely divided iron ores containing phosphorus which is not combined with the iron for the purpose of reducing and dephosphorizing them, preparatory to smelting, or further treatment, which will eliminate other impurities.

My improved method may be employed to advantage in the production of sponge, clinker, or the like, from magnetite or hematite sands, or comminuted iron ores generally wherein the phosphor content, for the most part at least, is not combined with the iron.

My invention may be practiced by first forming a cement, consisting of, say, forty parts limestone calcined with clayey matter and, say, sixty parts of the iron ore. This cement mixture is then incorporated with a mass of the iron ore in the proportion of one part of the mixture to, say, eight to sixteen parts iron ore, the final mixture being moistened and formed into suitable briquets, which are then dried. The relative proportions of the materials used in the formation of the briquets may be varied if desired, and I prefer that they be as low as practicable in silica and high in lime.

The briquets formed as described are then subjected under suitable confinement (as in a furnace stack) to the reducing action of hot carbonaceous gas at a temperature (preferably below 1400° F.) insufficient to smelt the ore or bind phosphorus to the iron. The fuel, from the combustion of which the hot reducing gases are generated, does not come into contact with the ore. After due subjection to the action of the gases the iron constituent of the ore, as it is changed to the metallic state, agglomerates into shells or skulls of irregular form, and may be characterized as sponge iron.

The temperature to which the ore is subjected is insufficient to flux the lime and silicates which remain in solid form and in comminuted condition and will fall away where not completely enveloped by the iron. As in that state the lime has great affinity for phosphorus, more or less of the latter is absorbed by and carried away with the lime. Some of the phosphorus may be carried off by the reducing gas.

It will be understood from the foregoing description that as the result of my process the iron constituent of the ore is formed into what may be characterized as sponge iron, either wholly dephosphorized or carrying but little of the phosphorus as compared with the phosphor-content of the ore.

What I claim as new and desire to secure by Letters Patent, is—

1. The method of treating finely divided iron ore to eliminate its phosphor content, which consists in briqueting the ore with a mixture containing lime and subjecting the briqueted mixture to the action of a reducing gas at a temperature sufficient to reduce the iron to a metallic state but insufficient to melt the ore or flux the lime, and causing separation from the iron of the residual materials of said mixture.

2. The herein described method of reducing and dephosphorizing finely divided iron ore, which consists in forming the ore into cement briquets containing lime, and subjecting the briquets to the action of a reducing gas at a temperature sufficient to reduce and agglomerate the iron particles, but insufficient to bind the phosphorus to the iron or flux the lime.

3. The herein described method of reducing and dephosphorizing finely divided iron ore, which consists in briqueting the ore with a binding mixture of lime and clay and subjecting the briquets to the action of a reducing gas at a temperature sufficient to reduce and agglomerate the iron particles but insufficient to bind the phosphorus to the iron or flux the lime.

JOHN T. JONES.

In presence of—
RALPH A. SCHAEFER,
W. T. JONES.